United States Patent
Kim et al.

(10) Patent No.: US 10,845,941 B2
(45) Date of Patent: Nov. 24, 2020

(54) IMAGE DISPLAY APPARATUS AND METHOD

(71) Applicant: SAMSUNG ELECTRONICS CO., LTD., Suwon-si (KR)

(72) Inventors: Sung-hyun Kim, Yongin-si (KR); Yong-deok Kim, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/946,210

(22) Filed: Apr. 5, 2018

(65) Prior Publication Data

US 2018/0307398 A1   Oct. 25, 2018

Related U.S. Application Data

(60) Provisional application No. 62/488,158, filed on Apr. 21, 2017.

(30) Foreign Application Priority Data

Aug. 17, 2017   (KR) .................. 10-2017-0104367

(51) Int. Cl.
*G06F 3/0481* (2013.01)
*G06F 3/0346* (2013.01)
(Continued)

(52) U.S. Cl.
CPC ........ *G06F 3/04815* (2013.01); *G06F 3/0346* (2013.01); *G06F 3/04845* (2013.01);
(Continued)

(58) Field of Classification Search
CPC .................................................. G06F 3/04815
See application file for complete search history.

(56) References Cited

U.S. PATENT DOCUMENTS

| | | |
|---|---|---|
| 6,671,400 B1 | 12/2003 | Ekpar et al. |
| 8,830,142 B1 | 9/2014 | Kim et al. |
| (Continued) | | |

FOREIGN PATENT DOCUMENTS

| | | |
|---|---|---|
| KR | 10-2013-0071755 A | 7/2013 |
| KR | 10-2017-0014491 A | 2/2017 |

OTHER PUBLICATIONS

International Search Report (PCT/ISA/210) dated Jun. 22, 2018, issued by the International Searching Authority in counterpart International Patent Application No. PCT/KR2018/003239.
(Continued)

*Primary Examiner* — Phi Hoang
(74) *Attorney, Agent, or Firm* — Sughrue Mion, PLLC

(57) ABSTRACT

An image display apparatus and method of displaying a 360-degree image are provided. The image display apparatus includes a display and a processor configured to receive a user input to move a view point of the 360-degree image, to obtain information indicating a recommended view point from a search region corresponding to the user input based on a composition detection parameter set corresponding to a category of the 360-degree image or a user-preferred composition, move the 360-degree image from a current view point to the recommended view point in response to the user input, and to control the display to display a region corresponding to the recommended view point in the 360-degree image.

20 Claims, 14 Drawing Sheets

(51) Int. Cl.
    *G06T 7/70*     (2017.01)
    *G06N 3/063*     (2006.01)
    *H04N 21/4147*     (2011.01)
    *G06F 3/0484*     (2013.01)
    *H04N 21/439*     (2011.01)
    *G06N 3/08*     (2006.01)

(52) U.S. Cl.
    CPC ............... *G06N 3/063* (2013.01); *G06N 3/08* (2013.01); *G06T 7/70* (2017.01); *H04N 21/4147* (2013.01); *H04N 21/439* (2013.01)

(56) References Cited

U.S. PATENT DOCUMENTS

| | | | |
|---|---|---|---|
| 9,558,428 B1 | 1/2017 | Green | |
| 9,582,731 B1 | 2/2017 | Butko et al. | |
| 2008/0260253 A1* | 10/2008 | Miyazaki | G06F 16/64 |
| | | | 382/190 |
| 2015/0161807 A1* | 6/2015 | Pack | G06T 11/206 |
| | | | 345/629 |
| 2017/0032536 A1 | 2/2017 | Lee et al. | |
| 2017/0083752 A1* | 3/2017 | Saberian | G06T 3/40 |
| 2017/0195615 A1* | 7/2017 | Han | G06F 3/04883 |
| 2017/0318011 A1* | 11/2017 | Yoo | H04L 63/0838 |
| 2018/0097866 A1* | 4/2018 | Pique Corchs | G06K 9/00288 |
| 2018/0121729 A1* | 5/2018 | Chang | G06K 9/00362 |
| 2018/0249189 A1* | 8/2018 | Cole | G06T 15/06 |

OTHER PUBLICATIONS

Written Opinion (PCT/ISA/237) dated Jun. 22, 2018, issued by the International Searching Authority in counterpart International Patent Application No. PCT/KR2018/003239.

Communication dated Mar. 12, 2019, issued by the Korean Patent Office in counterpart Korean Application No. 10-2017-0104367.

Communication dated Jul. 24, 2019 issued by the Korean Intellectual Property Office in counterpart Korean Application No. 10-2017-0104367.

Communication dated Sep. 6, 2019 issued by the Korean Intellectual Property Office in counterpart Korean Application No. 10-2017-0104367.

* cited by examiner

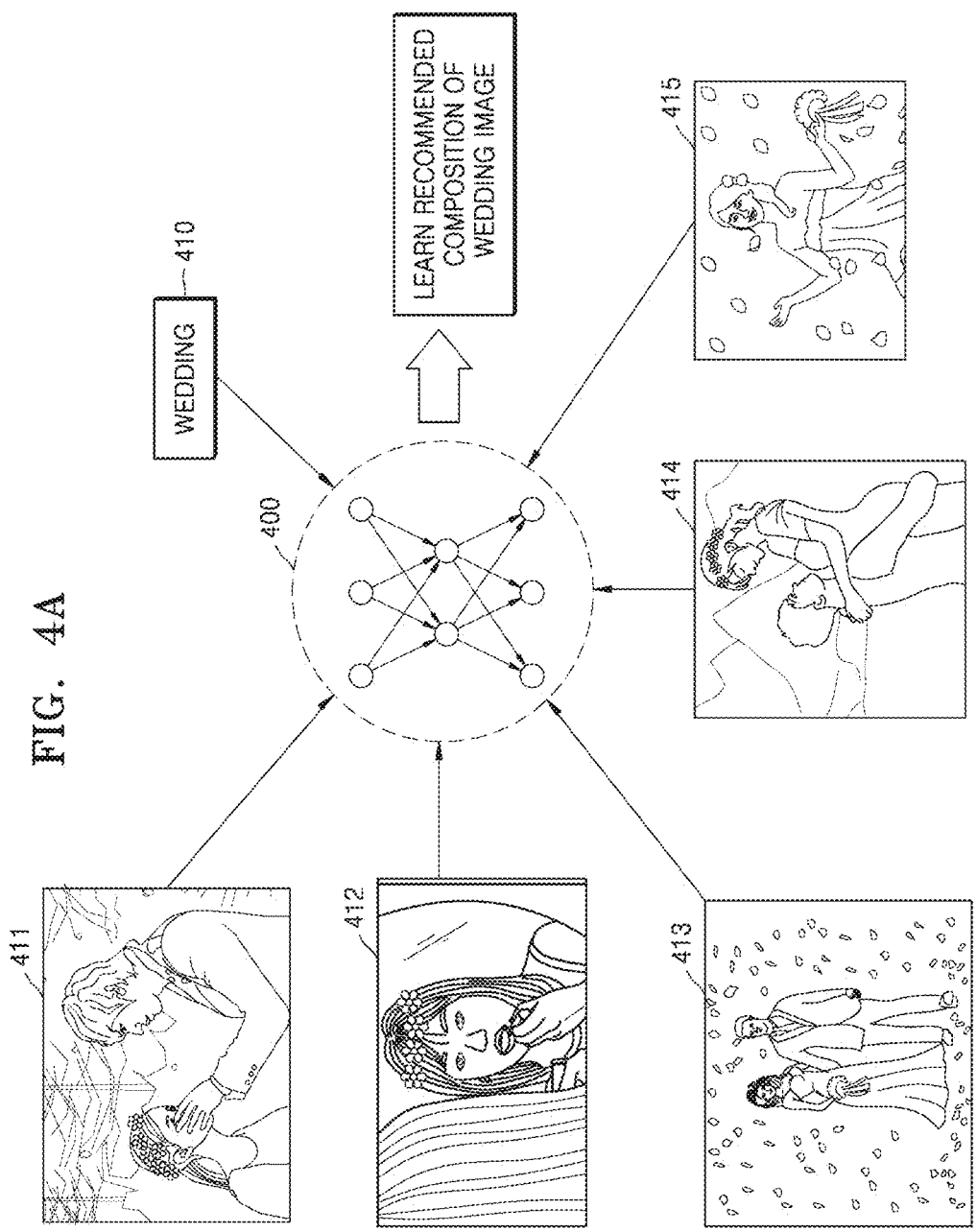

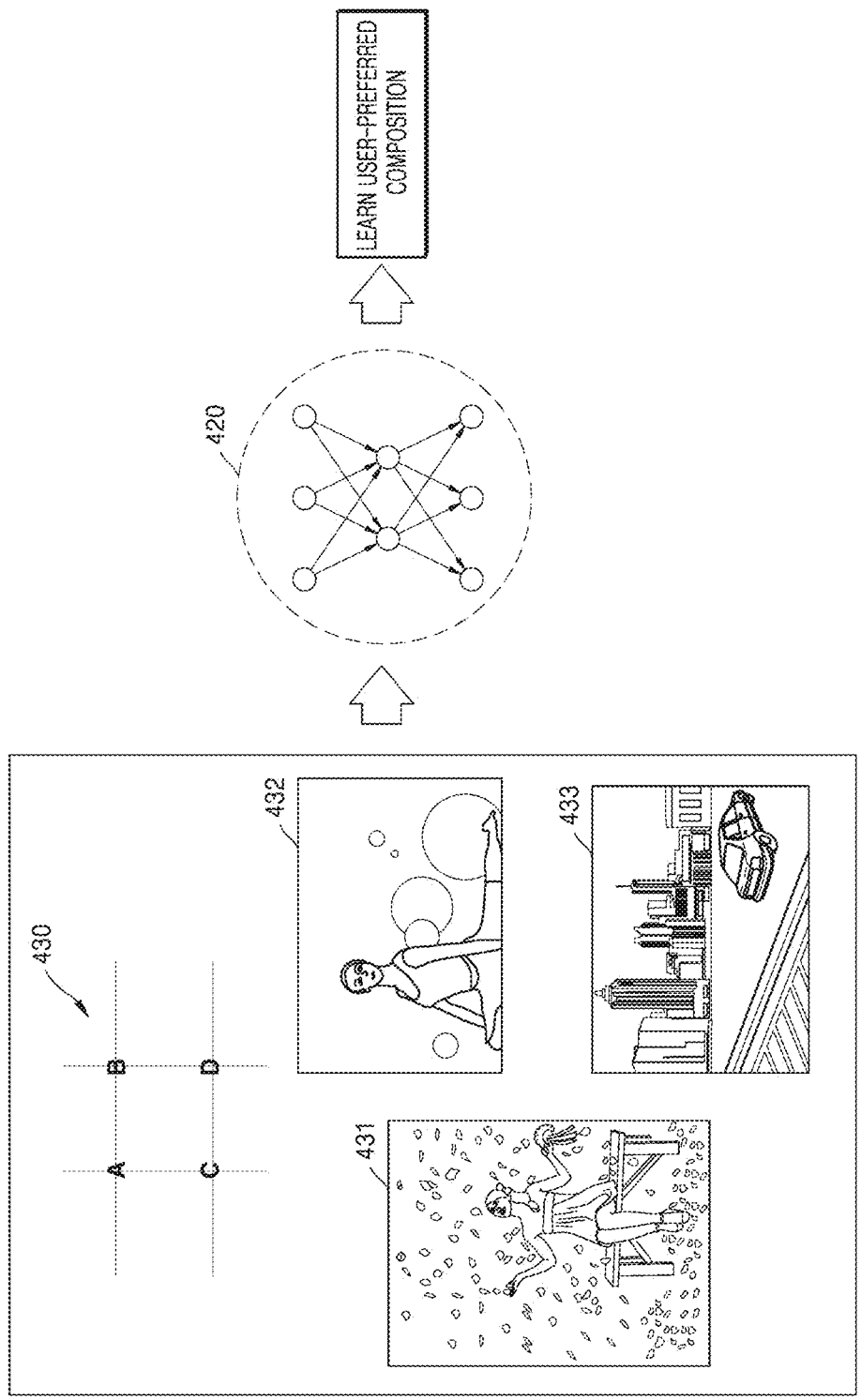

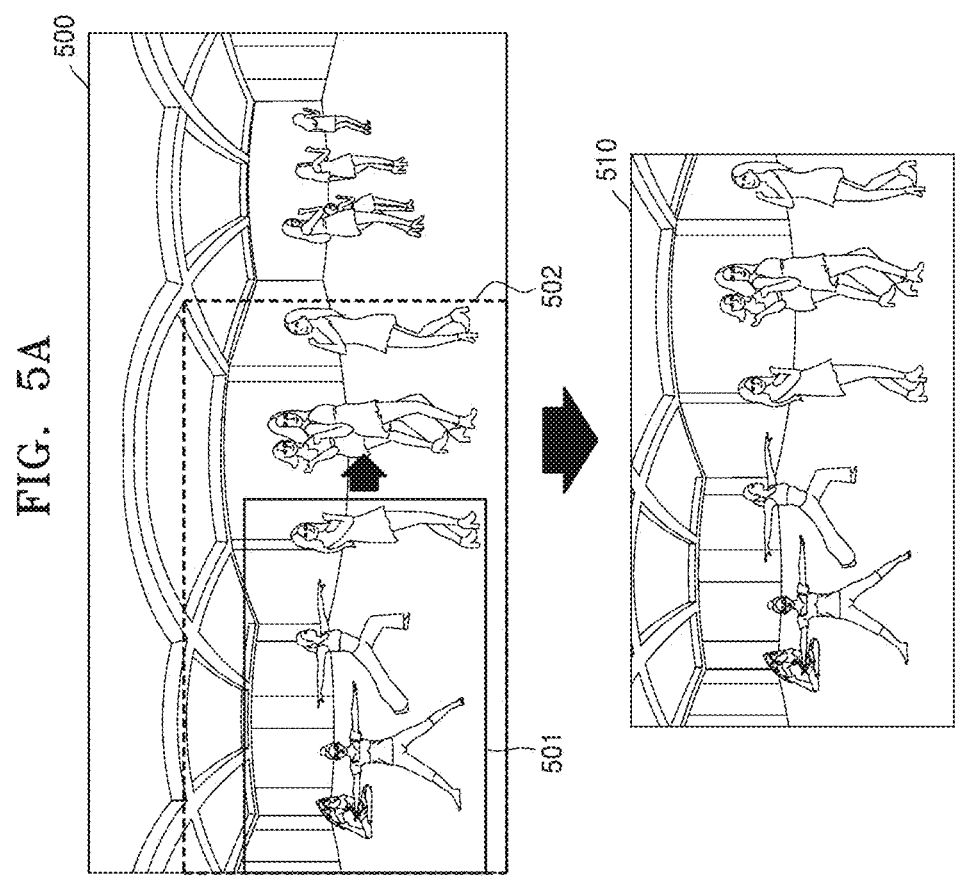

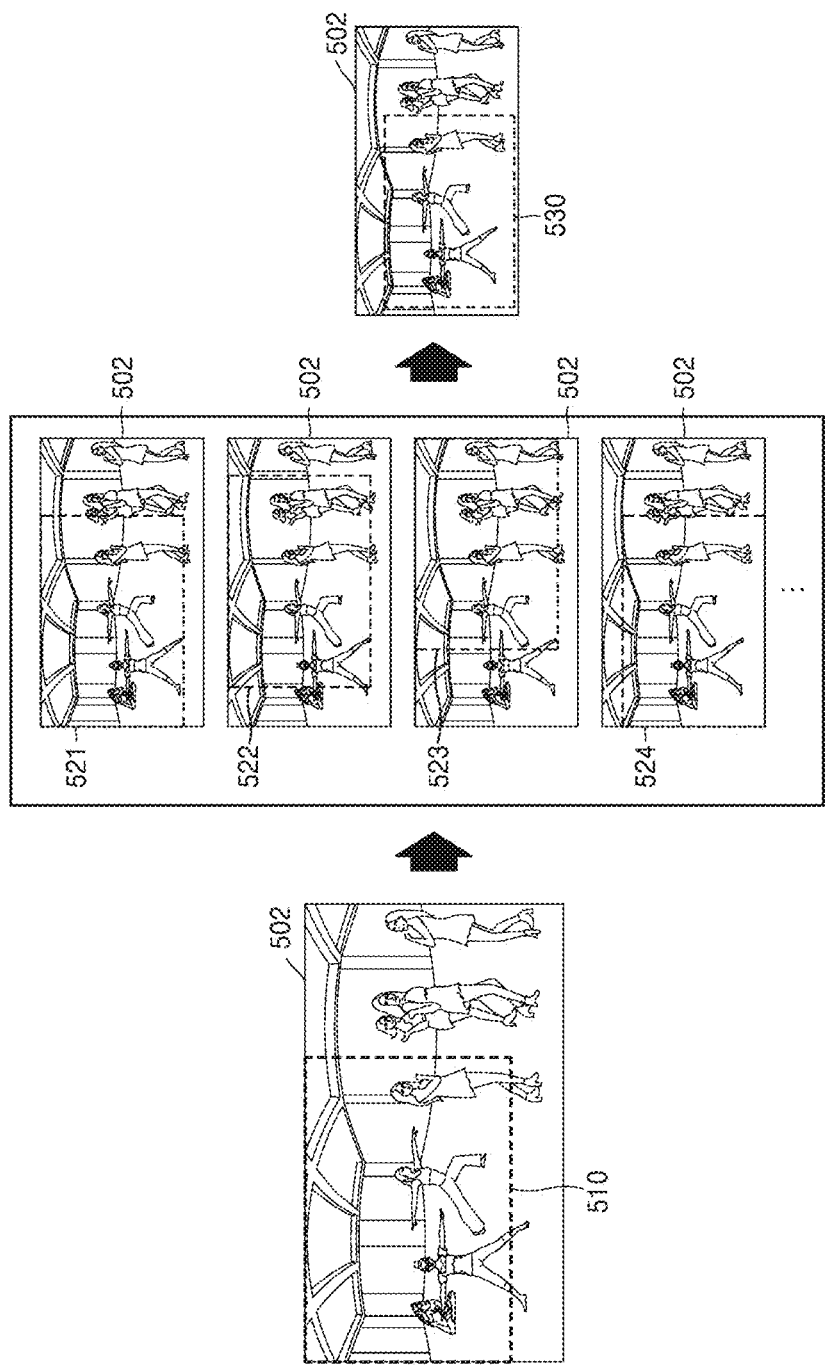

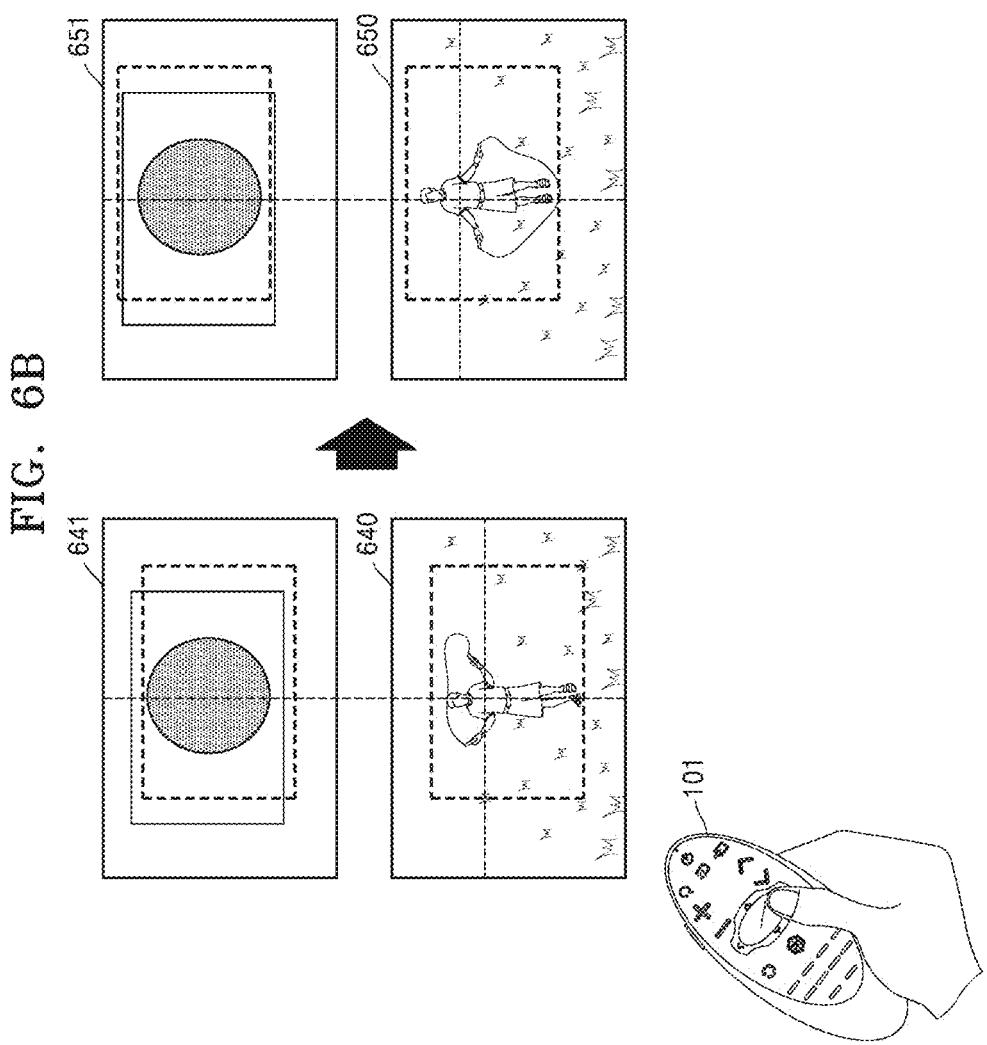

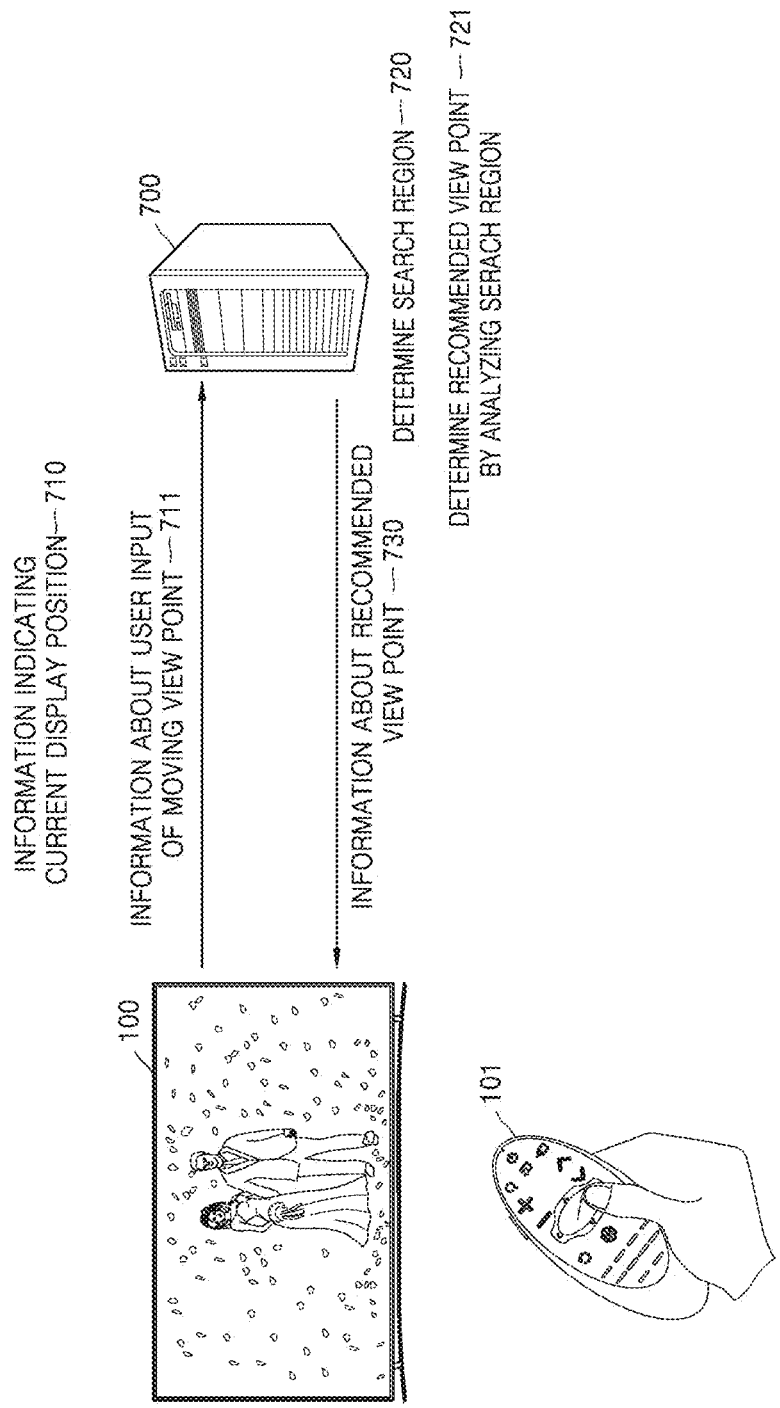

FIG. 8A
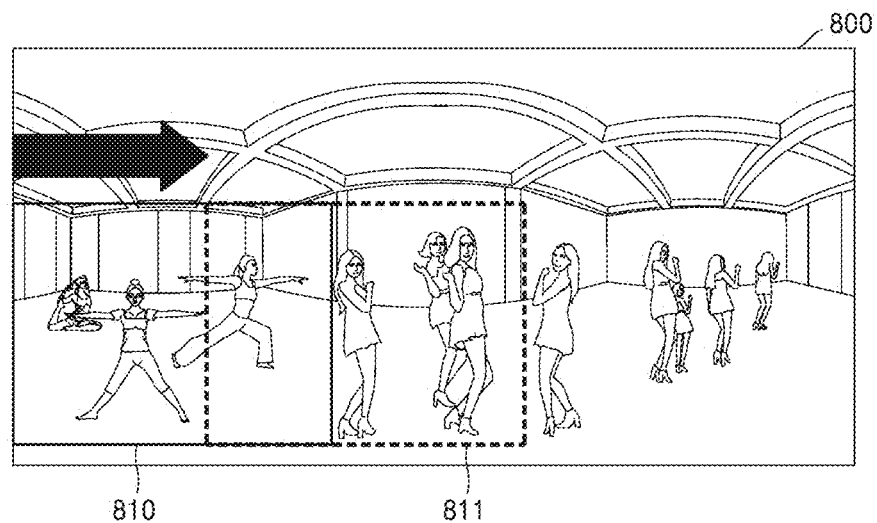
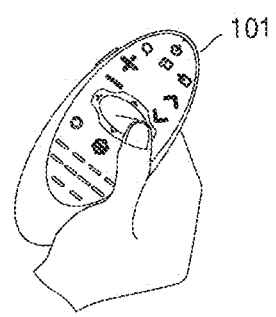

FIG. 8B
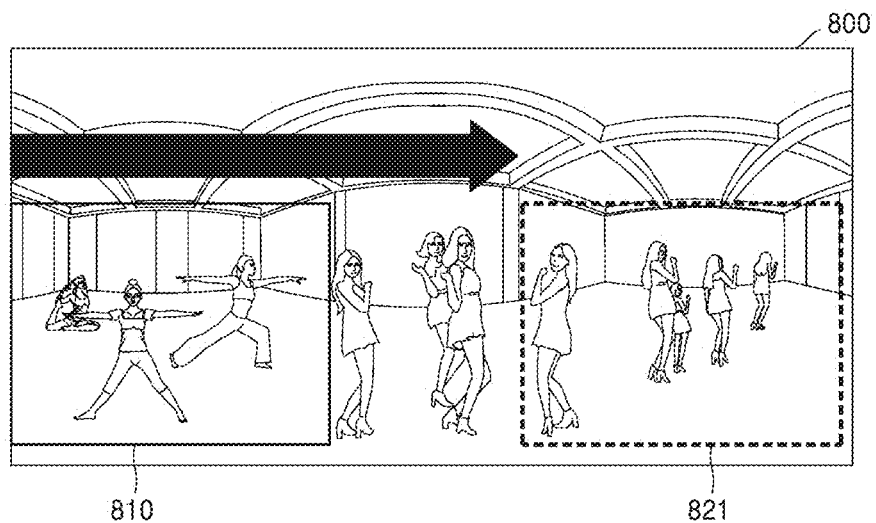
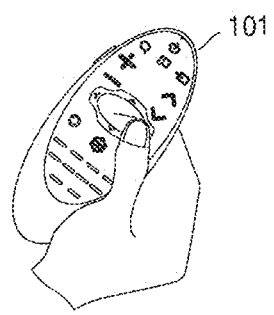

IMAGE DISPLAY APPARATUS AND METHOD

CROSS-REFERENCE TO RELATED APPLICATIONS

This application is based on and claims priority under 35 U.S.C. § 119 to U.S. Provisional Application No. 62/488,158, filed on Apr. 21, 2017, in the U.S. Patent and Trademark Office, and to Korean Patent Application No. 10-2017-0104367, filed on Aug. 17, 2017, in the Korean Intellectual Property Office, the disclosures of which are incorporated by reference herein in their entireties.

BACKGROUND

1. Field

The disclosure relates to an image display apparatus and method, and more particularly, to an image display apparatus and method which display a 360-degree image.

2. Description of the Related Art

Display apparatuses may display images for users to watch. For example, users may watch a broadcast content through a display apparatus. The display apparatus displays broadcast content selected by the user from broadcast signals transmitted from a broadcasting station. The current global trend is moving toward digital broadcasting and away from analog broadcasting.

Digital broadcasting refers to broadcasting of digital images and voice signals. Digital broadcasting has less data loss due to being more robust against external noise, is more favorable to error correction, has a higher resolution, and provides a clearer screen than analog broadcasting. Unlike analog broadcasting, digital broadcasting may provide an interactive service.

Recently, smart televisions (TVs) that provide various contents as well as a digital broadcast content have been developed, and image display apparatuses capable of displaying 360-degree images have also been developed. The user may watch a 360-degree image from various angles by moving points of view of the 360-degree image. Since a region shown to the user in the 360-degree image varies according to a selected view point, a method to select a proper view point when the user views the 360-degree image is needed.

SUMMARY

In accordance with an aspect of the disclosure, there is provided an image display apparatus for displaying a 360-degree image, the image display apparatus including a display, and a processor configured to receive a user input to move a view point of the 360-degree image, obtain information indicating a recommended view point from a search region corresponding to the user input based on a composition detection parameter set corresponding to a category of the 360-degree image or a user-preferred composition, move the 360-degree image from a current view point to the recommended view point in response to the user input, and control the display to display a region corresponding to the recommended view point in the 360-degree image.

The composition detection parameter set may be determined by learning a recommended view point corresponding to the category of the 360-degree image in response to inputting category information indicating the category of the 360-degree image and a plurality of images belonging to the category into one or more neural networks.

The composition detection parameter set may be determined in a form of a linear combination of one or more layers indicating one or more recommended compositions corresponding to the category of the 360-degree image and weight values applied to the one or more layers.

The processor may be further configured to divide the search region into a plurality of regions each having a size of a screen corresponding to a size of a screen of the 360-degree image, analyze the plurality of regions by applying the composition detection parameter set or the user-preferred composition to each of the plurality of regions, and determine the recommended view point based on a result of the analyzing.

The processor may be further configured to transmit information indicating a current display position of the 360-degree image and information corresponding to a user input to move the view point of the 360-degree image to an external server, and obtain information about the recommended view point determined by the external server from the external server.

The search region may be a partial region of a 360-degree region analyzed to determine the recommended view point, and is set based on a direction in which the view point of the 360-degree image is moved in response to the user input, and wherein a size of the search region is determined based on at least one of a viewing angle at which the 360-degree image is displayed and an aspect ratio of a screen on which the 360-degree image is displayed.

The search region may be updated as the view point of the 360-degree image is moved in response to the user input, and the recommended view point is determined from the updated search region based on the composition detection parameter set or the user-preferred composition.

The category of the 360-degree image may be determined based on at least one of a genre of the 360-degree image, a place where the 360-degree image is captured, and a content of the 360-degree image, and the processor may be further configured to obtain information about the category of the 360-degree image based on at least one of a title of the 360-degree image and metadata of the 360-degree image.

The processor may be further configured to set a speed at which the 360-degree image is moved from the current view point to the recommended view point based on at least one of a distance between the current view point of the 360-degree image and the recommended view point and a type of the user input to move the view point of the 360-degree image.

The processor may be further configured to detect one or more objects included in the search region, and obtain the information corresponding to the 360-degree image based on movement of the detected one or more objects.

In accordance with aspect of the disclosure, there is provided an image display method of displaying a 360-degree image, the image display method including receiving a user input to move a view point of the 360-degree image, obtaining information indicating a recommended view point from a search region corresponding to the user input based on a composition detection parameter set corresponding to a category of the 360-degree image or a user-preferred composition, moving the 360-degree image from a current view point to the recommended view point in response to the user input, and displaying a region corresponding to the recommended view point in the 360-degree image.

The composition detection parameter set may be determined by learning a recommended view point corresponding to the category of the 360-degree image in response to inputting category information indicating the category of the 360-degree image and a plurality of images belonging to the category into one or more neural networks.

The composition detection parameter set may be determined in a form of a linear combination of one or more layers indicating one or more recommended compositions corresponding to the category of the 360-degree image and weight values applied to the one or more layers.

The obtaining of the information about the recommended view point may include dividing the search region into a plurality of regions each having a size of a screen corresponding to a size of a screen of the 360-degree image, analyzing the plurality of regions by applying the composition detection parameter set or the user-preferred composition to each of the plurality of regions, and determining the recommended view point based on a result of the analyzing.

The obtaining of the information about the recommended view point may include transmitting information indicating a current display position of the 360-degree image and information about a user input to move the view point of the 360-degree image to an external server, and obtaining information about the recommended view point determined by the external server from the external server.

The search region may be a partial region of the 360-degree region analyzed to determine the recommended view point, and is set based on a direction in which the view point of the 360-degree image is moved in response to the user input, and a size of the search region is determined based on at least one of a viewing angle at which the 360-degree image is displayed and an aspect ratio of a screen on which the 360-degree image is displayed.

The search region may be updated as the view point of the 360-degree image is moved in response to the user input, and the recommended view point is determined from the updated search region based on the composition detection parameter set or the user-preferred composition.

The category of the 360-degree image may be determined based on at least one of a genre of the 360-degree image, a place where the 360-degree image is captured, and a content of the 360-degree image, and the image display method further comprises obtaining information corresponding to the category of the 360-degree image based on at least one of a title of the 360-degree image and metadata of the 360-degree image.

The v of the information about the recommended view point may include detecting one or more objects included in the search region, and obtaining the information corresponding to the 360-degree image based on movement of the detected one or more objects.

In accordance with aspect of the disclosure, there is provided a non-transitory computer-readable recording medium may have recorded thereon a program that is executable by a computer to perform the image display method.

The speed at which the 360-degree image may be moved from the current view point to the recommended view point is inversely proportional to the distance between the current view point of the 360-degree image and the recommended view point.

The 360-degree image may be moved from the current view point to the recommended view point at a speed inversely proportional to a distance between the current view point of the 360-degree image and the recommended view point.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 4A and 4B are diagrams illustrating a process of learning a composition detection parameter set according to an embodiment;

FIGS. 5A and 5B are diagrams illustrating a process of determining a recommended view point according to an embodiment;

FIGS. 6A and 6B are diagrams illustrating a method of determining a recommended view point, based on a composition detection parameter set or a user-preferred composition according to an embodiment;

FIGS. 7A and 7B are diagrams illustrating a process of receiving information indicating a recommended view point from an external server according to an embodiment;

FIGS. 8A and 8B illustrate an example in which an image display apparatus according to an embodiment moves a view point of a 360-degree image at a different speed, based on a distance between a current view point and a recommended view point;

DETAILED DESCRIPTION

Figure 1:
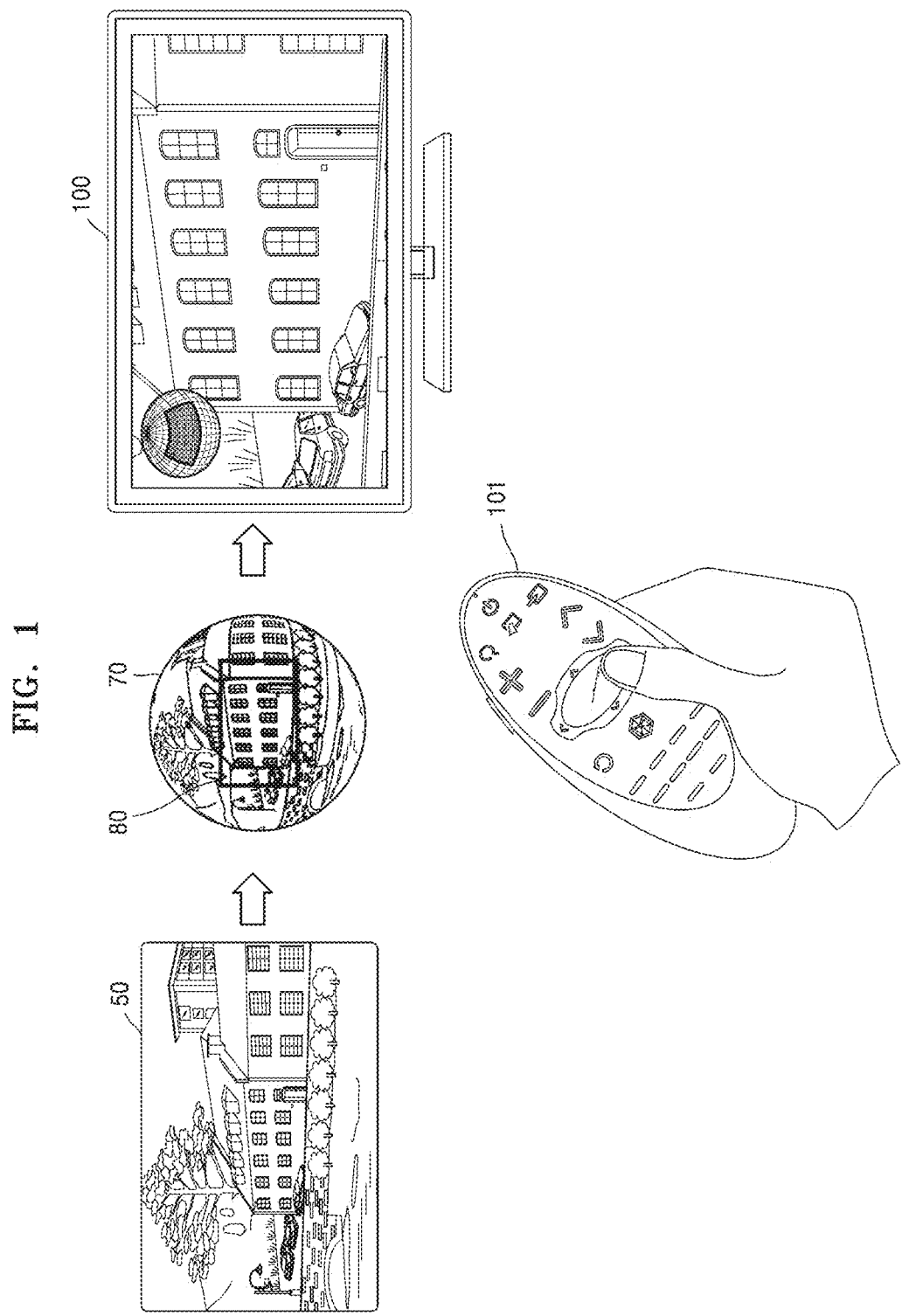
FIG. 1 illustrates an image display apparatus for displaying a 360-degree image according to an embodiment.

Reference will now be made in detail to embodiments, examples of which are illustrated in the accompanying drawings, wherein like reference numerals refer to like elements throughout. In this regard, the embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list. For example, "at least one from among a, b, and c," should be understood as including only a, only b, only c, both a and b, both a and c, both b and c, or all of a, b, and c.

Hereinafter, embodiments of the disclosure will be described in detail with reference to the attached drawings. However, the disclosure may be implemented in various forms, and are not limited to the embodiments described herein. Throughout the specification, identical reference numerals refer to identical parts.

Although terms used in the disclosure are selected with general terms popularly used at present under the consideration of functions in the present disclosure, the terms may vary according to the intention of those of ordinary skill in the art, judicial precedents, or introduction of new technology. Thus, the terms used in the present disclosure should be defined not by the simple names of the terms but by the meaning of the terms and the contents throughout the present disclosure.

The terms used in the present disclosure are for the purpose of describing embodiments only and are not intended to be limiting. The singular forms are intended to include the plural forms as well, unless the context clearly indicates otherwise. Throughout the specification, when a part is connected to another part, the part is not only directly connected to another part but also electrically connected to another part with another device intervening in them. If it is assumed that a certain part includes a certain component, the term "including," "comprising," and "having" mean that a corresponding component may further include other components unless a specific meaning opposed to the corresponding component is written.

The use of "a," "an," and "the" and other demonstratives similar thereto may correspond to both a singular form and a plural form. Unless the order of operations of a method according to the disclosure is explicitly mentioned or described otherwise, the disclosure is not limited by the order the operations are mentioned.

The phrase used in various parts of the present specification, such as "in some embodiments" or "in an embodiment" does not necessarily indicate the same embodiment.

Some embodiments of the disclosure may be represented by block components and various process operations. All or some of such functional blocks may be implemented by various numbers of hardware and/or software components which perform specific functions. For example, functional blocks of the disclosure may be implemented with one or more microprocessors or circuit elements for a specific function. The functional blocks of the present disclosure may also be implemented with various programming or scripting languages. Functional blocks may be implemented as an algorithm executed in one or more processors. Furthermore, the present disclosure may employ any number of conventional techniques for electronics configuration, signal processing and/or control, data processing and the like. The term "mechanism", "element", "means", or "component" is used broadly and is not limited to mechanical or physical embodiments.

Connecting lines or connecting members between elements shown in the drawings are intended to merely illustrate functional connections and/or physical or circuit connections. In an actual device, connections between elements may be indicated by replaceable or added various functional connections, physical connections, or circuit connections.

Hereinafter, the present disclosure will be described with reference to the accompanying drawings.

FIG. 1 illustrates an image display apparatus for displaying a 360-degree image according to an embodiment.

An image display apparatus 100 according to an embodiment displays a 360-degree image.

The 360-degree image may have a 360-degree angle of view. For example, the 360-degree image may be generated based on a plurality of images captured in a 360-degree direction by using at least one camera. The plurality of captured images may be mapped to a sphere, and contact points of the mapped images may be connected (stitched) to generate a 360-degree image in the form of a sphere. The 360-degree image in the form of a sphere may be converted into a 360-degree image 50 in the form of a plane as shown in FIG. 1, to be transmitted to or stored in another device.

The image display apparatus 100 according to an embodiment may convert the 360-degree image 50 in the form of a plane (or the planar 360-degree image 50) into a 360-degree image 70 in the form of a sphere (or a spherical 360-degree image 70) by performing graphic-processing on the planar 360-degree image 50. For example, the image display apparatus 100 may generate the spherical 360-degree image 70 by mapping the planar 360-degree image 50 to a sphere. The image display apparatus 100 may select a partial region 80 corresponding to a specific view point from the spherical 360-degree image 70 and may display an image corresponding to the selected region 80.

The image display apparatus 100 according to an embodiment may display a region corresponding to the selected view point from the 360-degree image, and display a region corresponding to a changed view point in response to a user input of changing the view point. When the image display apparatus 100 is a device such as a head-mounted display (HMD), the user may watch the 360-degree image while wearing the image display apparatus 100. Thus, the user may more easily change the view point of the 360-degree image into a desired view point. However, when the image display apparatus 100 is a device controlled by a control device 101, such as a TV, it may be more difficult for the user to control the view point of the 360-degree image in detail by using the control device 101. For example, when the user desires to change the view point of the 360-degree image by using the control device 101, the user may need to move the view point several times to find a proper composition for viewing. Since the image display apparatus 100 displays only a partial region corresponding to a specific view point of the 360-degree image, it may be more difficult for the user to recognize information about a non-displayed view point until the user moves the view point. Thus, the user may have a difficulty in determining which view point provides a proper composition for viewing a currently non-displayed region in the 360-degree image. Therefore, a method of providing a recommended view point having a proper composition for viewing, based on a moving direction of the view point of the 360-degree image based on a user input to move the view point of the 360-degree image is needed.

The image display apparatus 100 according to an embodiment may set a search region, based on a moving direction of a view point of a 360-degree image upon receipt of a user input to move the view point of the 360-degree image, may determine a recommended view point having a proper composition for viewing by analyzing the set search region, and may move the view point of the 360-degree image to the recommended view point. Thus, when the image display apparatus 100 moves the view point of the 360-degree image in response to the user input of moving the view point of the 360-degree image, the image display apparatus 100 may move the view point of the 360-degree image to a proper composition for viewing.

The image display apparatus 100 according to an embodiment may be, but not limited to, a TV, and may be implemented with an electronic device including a display. For example, the image display apparatus 100 may be implemented with various electronic devices such as a cellular phone, a tablet personal computer (PC), a digital camera, a camcorder, a laptop computer, a desktop, an electronic (e)-book terminal, a digital broadcasting terminal, a personal digital assistant (PDA), a portable multimedia player (PMP), a navigator, an MP3 player, a wearable device, etc. The image display apparatus 100 may be of a fixed type or a mobile type, and may be a digital broadcasting receiver configured to receive digital broadcasting.

The image display apparatus 100 may be implemented with not only a flat display device, but also a curved display device provided with a screen having a curvature or a flexible display device having an adjustable curvature. An output resolution of the image display apparatus 100 may include, for example, high definition (HD), full HD, ultra HD, or a higher resolution than ultra HD.

The image display apparatus 100 may be controlled by the control device 101 that may be implemented with various forms of devices for controlling the image display apparatus 100, for example, remote controller or a cellular phone. When the display of the image display apparatus 100 is implemented with a touch screen, the control device 101 may be replaced with a user's finger, an input pen, etc.

The control device 101 may control the image display apparatus 100 by using short-range communication including infrared communication or Bluetooth. The control device 101 may control a function or an operation of the image display apparatus 100 by using at least one of a key, such as a button, touch pad, microphone configured to receive a user's voice, and sensor configured to recognize a motion of the control device 101, which are provided in the control device 101.

The control device 101 may include a power on/off button for powering on or off the image display apparatus 100. The control device 101 may perform channel switchover, volume control, selection of terrestrial broadcasting/cable broadcasting/satellite broadcasting, or environment setting, etc. based on a user input.

The control device 101 may be a pointing device. For example, the control device 101 may operate as a pointing device upon receipt of a particular key input.

In an embodiment of the disclosure, a user may be a person who controls a function or an operation of the image display apparatus 100 by using the control device 101, and may include a viewer, a manager, an installation engineer, etc.

Figure 2:
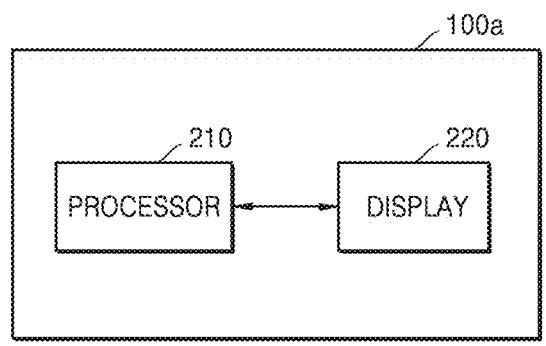
FIG. 2 is a block diagram of an image display apparatus according to an embodiment.

FIG. 2 is a block diagram of an image display apparatus according to an embodiment.

The image display apparatus 100a shown in FIG. 2 may be an example of the image display apparatus 100 shown in FIG. 1. Referring to FIG. 2, the image display apparatus 100a according to an embodiment may include a processor 210 and a display 220. However, the image display apparatus 100a may include more elements, and is not limited to the above-described example.

The processor 210 may be implemented with various combinations of one or more memories and one or more processors. For example, the memory may create and delete a program module according to an operation of the processor 210, and the processor 210 may execute operations of the program module.

The processor 210 according to an embodiment may receive a user input to move the view point of the 360-degree image.

The user input of moving the view point of the 360-degree image may be, but not limited to, an input of selecting a direction key in the control device 101. For example, when the control device 101 is implemented with a touch screen, the user input of moving the view point of the 360-degree image may include, but not limited to, an input of touching an icon indicating a key corresponding to a particular direction. The view point of the 360-degree image may be moved discontinuously in a preset unit (e.g., in the unit of 30 degrees) or continuously, depending on a type of the user input of moving the view point of the 360-degree image (e.g., a short-touch input, a long-touch input, a single tap, double taps, etc.).

The processor 210 according to an embodiment obtains information indicating a recommended view point from a search region set in response to a user input, based on, for example, at least one of a composition detection parameter for a category of the 360-degree image and a user-preferred composition.

The category may be set based on at least one attribute of the 360-degree image. The category may be determined based on, but not limited to, at least one of a genre of the 360-degree image, a place where the 360-degree image is captured, and a content of the 360-degree image. For example, the category may vary with the genre of the 360-degree image including a movie, a music video, a documentary, a sports image, news, an education image, etc. The category may vary with, but not limited to, the location where the 360-degree image is captured such as indoors or outdoors (e.g. by the sea). The category may vary with, but not limited to, the type of content of the 360-degree images, for example, a wedding, an animal, a performance, sport, etc.

Category information indicates the category of the 360-degree image, and may be expressed, but not limited to, in the form of metadata of the 360-degree image, a title of the 360-degree image, a tag of the 360-degree image, etc. For example, the category information may be represented as a part of metadata for expressing additional information about the 360-degree image. The category information may be expressed by the title of the 360-degree image, such as "wedding day", "national basketball championship final match", "ABC orchestra subscription concert", etc. The titles such as "wedding day", "national basketball championship final match", and "ABC orchestra subscription concert" may indicate that the category of the 360-degree image is a wedding image, a sport image, and the performance image, respectively. A web site that provides a streaming service may display one or more tags for describing the 360-degree image provided by the web site, together with the 360-degree image. For example, when an ABC soccer championship final match image is uploaded, a tag for describing an ABC soccer championship final match, such as "ABC soccer championship", "soccer", or "sport" may be uploaded together. In this case, the tag such as "ABC soccer championship", "soccer", or "sport" may indicate that the category of the image may be, for example, a "sport image".

The search region is a partial region of the 360-degree region analyzed to determine a recommended view point, and may be set based on a direction in which the view point of the 360-degree image is moved in response to a user input. For example, once the user input of moving the view point of the 360-degree image in a particular direction starts being received, the image display apparatus 100 may set a region including a currently displayed region in the 360-degree image as an initial search region.

A size of the search region may be determined based on at least one of a viewing angle at which the 360-degree image is displayed on one screen and an aspect ratio of the screen on which the 360-degree image is displayed. The size of the search region may be greater than a size of the screen on which the 360-degree image is displayed, and may increase proportionally to the viewing angle at which the 360-degree image is displayed on one screen. As the size of the search region increases, a region that needs to be analyzed to determine a recommended view point increases, such that the amount of computation needed to determine a recommended view point may increase. The size of the search region may be predetermined and stored in the image display apparatus 100, and the search range may be set to correspond to the predetermined stored size of the search region.

The image display apparatus 100 may update the search region until the user input of moving the view point of the 360-degree image is terminated. For example, if a user input to move the view point of the 360-degree image to the right is received continuously, the image display apparatus 100 may update the search region while continuously moving the search region to the right. Once the user input of moving the view point of the 360-degree image is terminated, the image display apparatus 100 obtains information indicating a recommended view point, based on a result of analyzing a finally updated search region.

The composition detection parameter set may be determined by learning a recommended composition for a category in response to the input of the category information of the 360-degree image and a plurality of images belonging to the category into one or more neural networks. The neural network may be a set of algorithms for learning the recommended composition for the category from the category information indicating the category of the 360-degree image and the plurality of learning images belonging to the category, which are input to the neural network, based on artificial intelligence (AI).

For example, when the 360-degree image is a wedding image, category information indicating that the category of the 360-degree image is the "wedding image" and a plurality of learning images belonging to the category, the "wedding image", may be input into one or more neural networks. The plurality of learning images may include a plurality of wedding images captured in different compositions. In this case, the plurality of learning images may include a plurality of images captured in a recommended composition proper for the wedding image. For example, the plurality of images captured in the recommended composition may include, but not limited to, an image captured by an expert, an image having many views, an image captured with fee, etc.

The neural network may learn a relationship between the category of the 360-degree image and the recommended composition, based on supervised learning that learns the recommended composition for the category by supervising whether an input learning image has a proper composition or an improper composition for the category and unsupervised learning that discovers a pattern for determining a proper composition and an improper composition for the category by self-learning a plurality of input images without separate supervision. The neural network may also learn the relationship between the category of the 360-degree image and the recommended composition, based on reinforcement learning using a feedback regarding whether a result of determining a user's state based on learning is correct. A description of a process of learning the relationship between the category of the 360-degree image and the recommended composition will be made later with reference to FIG. 4.

According to an embodiment, the processor 210 may transmit category information indicating the category of a 360-degree image that the user currently views and information about a user input to move a view point of the 360-degree image to an external server, and may receive a composition detection parameter set for the category from the external server. In this case, an operation of determining the recommended view point, based on the composition detection parameter set or the user-preferred composition may be performed by the processor 210. The processor 210 may set a search region based on the view point of the 360-degree image that the user currently views and the user input of moving the view point of the 360-degree image. The processor 210 may determine a view point corresponding to a region having a proper composition in the search region by analyzing the search region based on the composition detection parameter set or the user-preferred composition received from the external server.

According to an embodiment, an operation of determining the recommended view point may be performed by the external server. For example, the external server may store the 360-degree image that the user currently views through the image display apparatus 100 and the composition detection parameter set corresponding to the category of the 360-degree image. The processor 210 may transmit information indicating a current display position of the 360-degree image and information about the user input of moving the view point of the 360-degree image to the external server. The processor 210 may receive information about the recommended view point determined based on the composition detection parameter set for the category of the 360-degree image or the user-preferred composition from the external server.

The information about the recommended view point may be expressed in the form of, for example, coordinates indicating the recommended view point to distinguishably indicate a region corresponding to the recommended view point in the search region, however, embodiments are not limited to this example.

The image display apparatus 100 according to an embodiment may move the view point of the 360-degree image to the recommended view point based on the obtained information about the recommended view point.

As such, the image display apparatus 100 does not need to manually control the view point to search for a proper composition for user's viewing, by moving the view point of the 360-degree image to a view point corresponding to the proper composition for user's viewing in response to a user input to move the view point of the 360-degree image.

Figure 3:
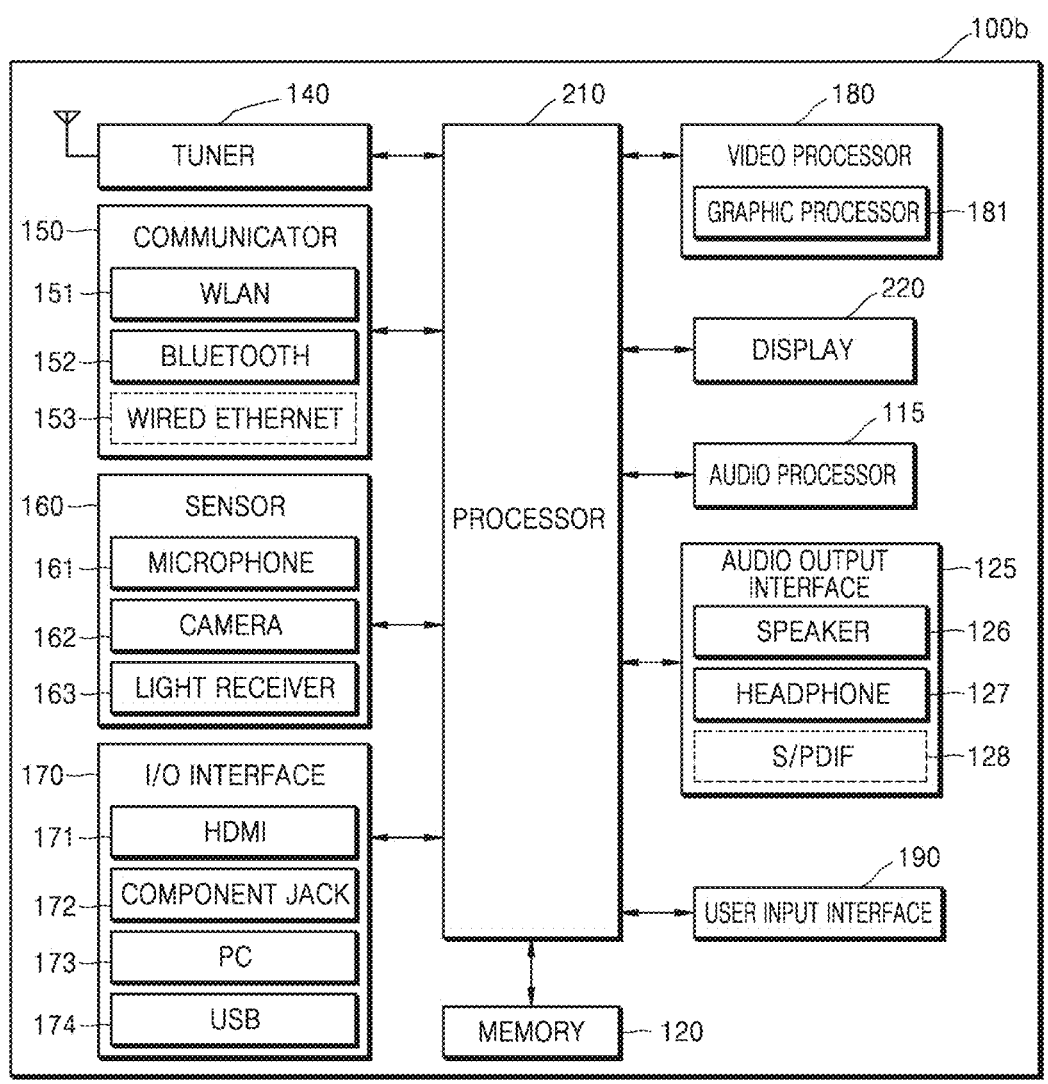
FIG. 3 is a block diagram of an image display apparatus according to another embodiment.

FIG. 3 is a block diagram of an image display apparatus according to another embodiment.

As shown in FIG. 3, an image display apparatus 100b may further include a memory 120, a tuner 140, a communicator 150, a sensor 160, an input/output (I/O) interface 170, a video processor 180, an audio processor 115, an audio output interface 125, and a user input interface 190 in addition to the processor 210 and the display 220.

The same description of the processor 210 and the display 220 as provided with reference to FIG. 2 will be omitted.

The memory 120 may include a storage medium of at least one type of a flash memory type, a hard disk type, a multimedia card micro type, a card type memory (e.g., a secure digital (SD) or extreme digital (XD) memory, etc.), a random-access memory (RAM), a static random-access memory (SRAM), a read-only memory (ROM), an electrically erasable programmable read-only memory (EEPROM), a programmable read-only memory (PROM), a magnetic memory, a magnetic disk, an optical disk, etc.

The memory 120 according to an embodiment may include a module including instructions for receiving a user input to move a view point of a 360-degree image, obtaining information indicating a recommended view point from a search region corresponding to the user input based on a composition detection parameter for a category of the 360-degree image or a user-preferred composition, and controlling the display to display a region corresponding to the recommended view point in the 360-degree image.

The memory 120 according to an embodiment may store a composition detection parameter set received from an external server.

The tuner 140 selects a frequency of a channel the image display apparatus 100b desires to receive from among many electric wave components by tuning the frequency through amplification, mixing, resonance, etc. with respect to a broadcast signal received wired or wirelessly. The broadcast signal may include audio, video, and additional information (e.g., an electronic program guide (EPG)).

The broadcast signal received through the tuner 140 may be decoded (e.g., audio-decoded, video-decoded, or additional-information-decoded) and separated into audio, video, and/or additional information. The separated audio, video, and/or additional information may be stored in the memory 120 under control of the processor 210.

There may be one or a plurality of tuners 140 in the image display apparatus 100b. The tuner 140 may be implemented as all-in-one with the image display apparatus 100b or as a separate device including a tuner electrically connected with the image display apparatus 100b (e.g., a set-top box or a tuner unit connected to the I/O interface 170).

The communicator 150 may connect the image display apparatus 100b with an external device (e.g., an audio device, etc.) under control of the processor 210. The processor 210 may transmit/receive content to/from an external device connected through the communicator 150, download an application from the external device, or browse the internet.

The communicator 150 may include at least one of a wireless local area network (WLAN) 151, Bluetooth 152, and wired Ethernet 153, depending on capabilities and structure of the image display apparatus 100b. The communicator 150 may include a combination of the WLAN 151, the Bluetooth 152, and the wired Ethernet 153. The communicator 150 may receive a control signal of the control device 101 under control of the processor 210. The control signal may be implemented as a Bluetooth type, a radio frequency (RF) signal type, or a WiFi type.

The communicator 150 may further include other short-range communications (e.g., near field communication (NFC), Bluetooth Low Energy (BLE), etc.) in addition to Bluetooth.

The communicator 150 according to an embodiment may receive information indicating a recommended view point from an external server, and may receive a composition detection parameter set corresponding to a category of a 360-degree image from the external server according to an embodiment.

The sensor 160 may sense a user's voice, a user's image, or a user's interaction, etc. and may include a microphone 161, a camera 162, and a light receiver 163, etc.

The microphone 161 receives an uttered voice of the user. The microphone 161 may convert the received voice into an electric signal and output the electric signal to the processor 210.

The camera 162 receives an image (e.g., a continuous frame) corresponding to a user's motion including a gesture in a camera recognition range.

The light receiver 163 receives a light signal (including a control signal) received from the control device 101. The light receiver 163 may receive a light signal corresponding to a user input (e.g., a touch, a press, a touch gesture, a voice, a motion, etc.) from the control device 101. A control signal may be extracted from the received light signal under control of the processor 210.

The light receiver 163 according to an embodiment may receive a light signal corresponding to a user input of changing a view point from the control device 101.

The I/O interface 170 receives video (e.g., moving images, etc.), audio (e.g., a voice, music, etc.), and additional information (e.g., an EPG, etc.) from an external source outside the image display apparatus 100b, under control of the processor 210. The I/O interface 170 may include one of an HDMI port 171, a component jack 172, a PC port 173, and a USB port 174. The I/O interface 170 may include a combination of the HDMI port 171, the component jack 172, the PC port 173, and the USB port 174.

The memory 120 according to an embodiment stores programs for processing and control by the processor 210 and data input to or output from the image display apparatus 100b.

The processor 210 controls overall operations of the image display apparatus 100b and a signal flow among the internal elements of the image display apparatus 100b, and processes data. The processor 210 executes an operating system (OS) and various applications stored in the memory 120, if a user input is input or a preset and stored condition is satisfied.

The processor 120 according to an embodiment may receive a user input to move a view point of a 360-degree image, obtain information indicating a recommended view point from a search region corresponding to the user input based on a composition detection parameter for a category of the 360-degree image or a user-preferred composition, and control the display to display a region corresponding to the recommended view point in the 360-degree image, by executing one or more instructions stored in the memory 120.

The video processor 180 performs various image processing, such as decoding, scaling, noise filtering, frame rate conversion, resolution conversion, etc., with respect to video data.

The display 220 displays video included in a broadcast signal received through the tuner 140 on a screen under control of the processor 210. The display 220 displays contents (e.g., video) input through the communicator 150 or the I/O interface 170. The display 220 outputs an image stored in the memory 120 under control of the processor 210.

The audio processor 115 processes audio data. The audio processor 115 performs various processing such as decoding, amplification, noise filtering, etc., with respect to the audio data. The audio output interface 125 outputs audio included in a broadcast signal received through the tuner 140, audio input through the communicator 150 or the I/O interface 170, and audio stored in the memory 120, under control of the processor 210. The audio output interface 125 may include at least one of a speaker 126, a headphone output terminal 127, and a Sony/Phillips digital interface (S/PDIF) output terminal 128.

The user input interface 190 is configured to input data for controlling the image display apparatus 100b. For example, the user input interface 190 may include, but not limited to, a key pad, a dome switch, a touch pad, a jog wheel, a jog switch, etc.

The user input interface 190 may be an element of the control device 101 or an element of the image display apparatus 100b.

The user input interface 190 according to an embodiment may receive an input for moving the view point of the 360-degree image. For example, when the user input interface 190 includes a key pad or a dome switch, the input for moving the view point may be an input of clicking or pressing a key corresponding to a particular direction. When the user input interface 190 includes a touch pad, the input may be a touch on a key corresponding to a particular direction, without being limited to the above-described example.

In case of the user input of moving the view point, the amount of change in the view point may vary depending on a way to click or touch the key. For example, if the key is pressed or touched longer than a predetermined time, the view point may be continuously moved. If the key is clicked or pressed for a time shorter than the predetermined time, the view point may be moved in the unit of a specific angle. For example, each time when the user clicks or touches a key corresponding to a right direction, the view point may be moved by, for example, 30 degrees to the right. But embodiments are not limited thereto.

Meanwhile, the block diagrams of the image display apparatuses 100a and 100b shown in FIGS. 2 and 3, respectively, are block diagrams for an embodiment. Elements of the block diagram may be integrated, added, or omitted depending on the specifications of the image display apparatus 100a and 100b implemented. That is, when necessary, two or more elements may be integrated into one element or one element may be divided into two or more elements. A function or operation executed by each element (or module) is intended to describe embodiments, and a detailed operation or apparatus thereof does not limit the scope of the disclosure.

FIGS. 4A and 4B are diagrams illustrating a process of learning a composition detection parameter set according to an embodiment.

The image display apparatus 100 learns the relationship between the category of the 360-degree image and the recommended composition for the category by using one or more images belonging to the category to configure the composition detection parameter set.

When the user views the 360-degree image, whether a region corresponding to a currently displayed view point in the 360-degree image has a proper composition may vary with the category of the 360-degree image. For example, the recommended view point may vary with the category of the 360-degree image such as a sport image having much movement of an object in the 360-degree image, a wedding image having main objects of a bride and a groom, a trip program image including a natural scenery, etc. Thus, the image display apparatus 100 configures the composition detection parameter set by learning the relationship between the category of the 360-degree image and the recommended view point, and determines the recommended view point, based on the configured composition detection parameter set.

For example, one or more neural networks may learn a recommended composition for a category by using category information indicating the category of the 360-degree image and a plurality of images belonging to the category. The plurality of learning images belonging to the same category may include images having different compositions and also mean images having a limited viewing angle, which are not 360-degree images. Referring to FIG. 4A, if the category of the 360-degree image is a wedding image 410, a plurality of learning images may include a plurality of wedding images 411, 412, 413, 414, and 415 captured in different compositions. For example, in the wedding image, a recommended composition may vary with a scene in which the bride and the groom are photographed in front, a scene in which guests are photographed, a scene in which surroundings of a wedding hall are captured, etc., such that there may be a plurality of recommended compositions in one category, the wedding image. Thus, once the category information indicating that the category of the 360-degree image is determined as the wedding image and the wedding images 411, 412, 413, 414, and 415 captured in various compositions are input to one or more neural networks 400, the one or more neural networks 400 learn a recommended composition of the wedding image. The one or more neural networks 400 indicate a result of learning the recommended composition as the composition detection parameter set.

The composition detection parameter set may be a linear combination of a plurality of layers indicating a plurality of recommended compositions for one category, respectively, and weight values applied to the plurality of layers. The image display apparatus 100 matches each layer to the search region and determines a view point corresponding to a region having the highest similarity with the plurality of recommended compositions as a recommended view point based on a matching result.

The image display apparatus 100 according to an embodiment may learn a user-preferred composition by using one or more neural networks. For example, the user may desire to watch a 360-degree image in a particular user-preferred composition, regardless of a category of the image. In this case, the one or more neural networks may learn the user-preferred composition by using a plurality of learning images captured in the user-preferred composition.

Referring to FIG. 4B, for example, the user may desire to watch the 360-degree image in a tripartite composition 430, regardless of the category of the 360-degree image. One or more neural networks 420 may learn a user-preferred composition in response to the input of a plurality of learning images 431, 432, and 433 captured in the tripartite composition 430, and express a result of learning the user-preferred composition as a composition detection parameter set. For example, even the same tripartite composition may exist in various forms according to a position where an object is located. Thus, the composition detection parameter set having learned the tripartite composition may be, but not limited to, a linear combination of one or more layers indicating one or more compositions included in the tripartite composition and weight values applied to the one or more layers.

According to an embodiment, an operation of learning a recommended composition, based on a category of a 360-degree image and an operation of learning a user-preferred composition may be performed by the image display apparatus 100 or the external server, and the external server may store a learning result in the form of a composition detection parameter.

FIGS. 5A and 5B are diagrams illustrating a process of determining a recommended view point according to an embodiment.

The image display apparatus 100 according to an embodiment may set a search region corresponding to a user input to move a view point of a 360-degree image upon receipt of the user input. Referring to FIG. 5A, the image display apparatus 100 displays a region 501 corresponding to a specific view point in a 360-degree image 500. The user may desire to move the view point of the 360-degree image 500 while watching the region 501 corresponding to the specific view point. The image display apparatus 100 may set a search region 502 to be analyzed for determination of a recommended view point upon receipt of a user input to move the view point of a 360-degree image. As stated above, the search region 502 is a partial region of the 360-degree image 500, and may be set based on the currently displayed region 501 and may be larger than the currently displayed region 501. As the size of the search region 502 increases, a region that needs to be analyzed to determine the recommended view point also increases, requiring a time needed to determine the recommended view point. For example, as shown in FIG. 5A, in response to the user input of moving the view point of the 360-degree image 500 to the right, the image display apparatus 100 may set, but not limited to, the search region 502 including the currently displayed region 501 and further including a region located to the right of the currently displayed region 501.

The image display apparatus 100 according to an embodiment may update the search region 502 until the user input of moving the view point of the 360-degree image 500 is terminated. For example, the image display apparatus 100 may update the search region 502 by moving the set search region 502 to the right as the user input of moving the view point of the 360-degree image 500 to the right is continuously received. Once the final search region is set as the user input of moving the view point of the 360-degree image 500 to the right is terminated, the image display apparatus 100 determines a recommended view point by analyzing the final search region.

The image display apparatus 100 according to an embodiment may divide the search region 502 by a size of a screen on which the 360-degree image 500 is displayed, and analyzes the search region 502 by applying the composition detection parameter set or the user-preferred composition to each divided region. For example, the search region 502 may be larger than the size of a screen 510 on which the 360-degree image is displayed. The image display apparatus 100 may divide the search region 502 into a plurality of regions, each having the size of the screen 510 on which the 360-degree image is displayed, and the plurality of regions may overlap each other. The image display apparatus 100 determines a region having the most proper composition from among the plurality of regions based on a composition detection parameter set for the category of the 360-degree image or a user-preferred composition, and determines a view point corresponding to the determined region as a recommended view point.

For example, referring to FIG. 5B, the image display apparatus 100 sets a window 510 having the same size as the screen on which the 360-degree image is displayed, and moves the window 510 in the search region 502. The image display apparatus 100 analyzes regions 521, 522, 523, and 524 corresponding to the window 510 in a changed position each time when the position of the window 510 is changed.

The image display apparatus 100 determines a region 530 having the most similar composition with the most proper composition for the category of the 360-degree image or the user-preferred composition from among the plurality of regions 521, 522, 523, and 524 by analyzing the plurality of divided regions 521, 522, 523, and 524 in the search region 502 based on the composition detection parameter set or the user-preferred composition. The image display apparatus 100 determines a view point corresponding to the determined region 530 as a recommended view point.

Figure 6A:
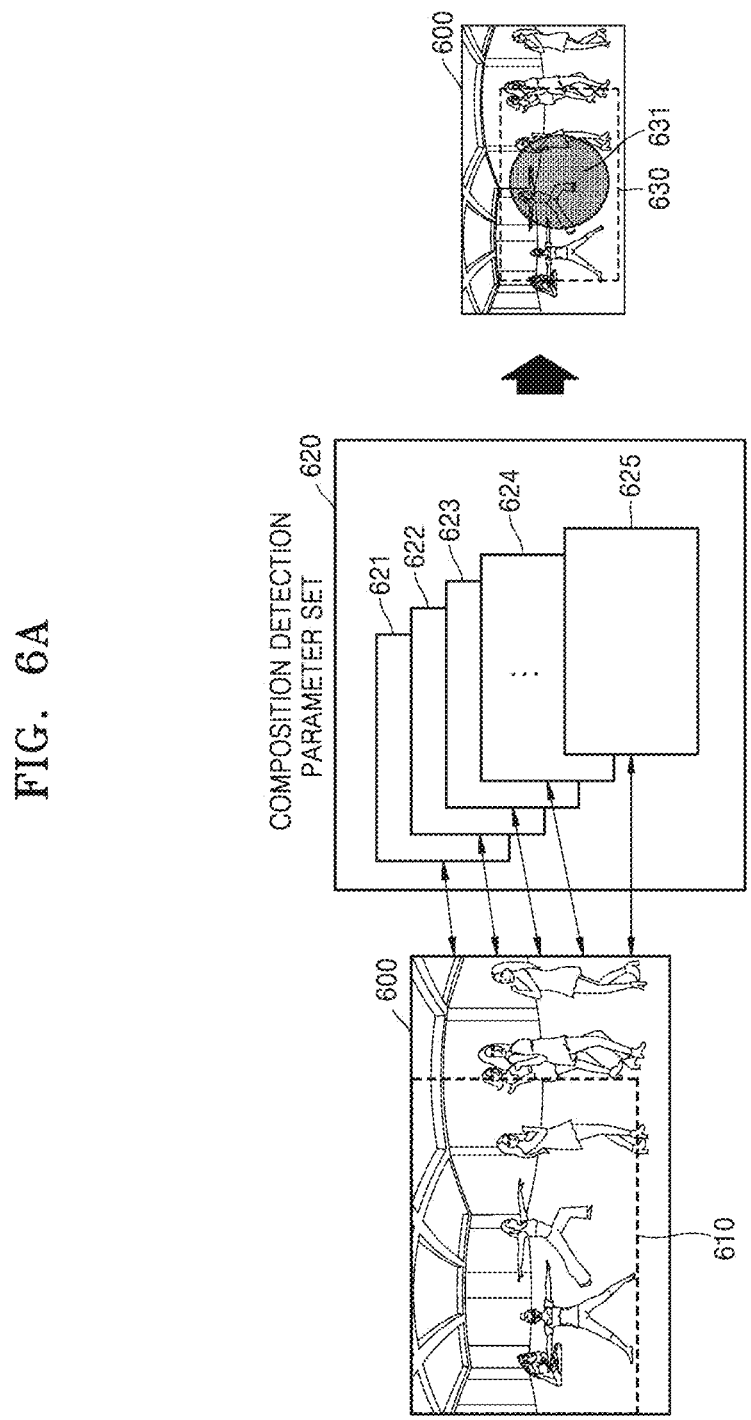

FIGS. 6A and 6B are diagrams illustrating a method of determining a recommended view point, based on a composition detection parameter set or a user-preferred composition according to an embodiment.

When the image display apparatus 100 determines a view point based on a composition detection parameter set corresponding to a category of a 360-degree image, the image display apparatus 100 divides a search region 600 into a plurality of regions, each having a size of a screen on which the 360-degree image is displayed, and analyzes each region by applying the composition detection parameter set.

Referring to FIG. 6A, the image display apparatus 100 analyzes a region 610 divided from the search region 600 by applying a composition detection parameter set 620.

The composition detection parameter set 620 may include composition detection parameters for a category of a currently played 360-degree image, and may vary with the category of the 360-degree image. The composition detection parameter set 620 may be expressed by layers 621, 622, 623, 624, and 625 indicating one or more proper recommended compositions for the category of the 360-degree image and weight values applied to the respective layers.

The image display apparatus 100 according to an embodiment may match the layers 621, 622, 623, 624, and 625 of the composition detection parameter set 620 to regions 610, 611, and 612 of the search region 600. Based on a result of matching with the layers 621, 622, 623, 624, and 625, a region 630 having the most proper composition in the search region 600 may be determined. For example, the image display apparatus 100 may match the divided region 610 of the search region 600 with the respective layers 621, 622, 623, 624, and 625 of the composition detection parameter set 620, and calculate scores, based on similarities between the divided region 610 and the respective layers 621, 622, 623, 624, and 625. The image display apparatus 100 sums the scores, considering weight values applied to the respective layers 621, 622, 623, 624, and 625, thereby calculating a total score regarding whether the divided region 610 includes an image having a proper composition. The image display apparatus 100 may calculate a total score regarding whether the divided region 610 includes an image having a proper composition for the plurality of regions 610, 611, and 612 divided from the search region 600, and may determine a view point corresponding to the region 630 having the highest total score as a recommended view point.

As shown in FIG. 6A, information indicating the recommended view point may be an indication 631 making a view point corresponding to the region 630 having the highest total score distinguished in the search region 600, and depending on an embodiment, may be coordinates indicating the view point corresponding to the region 630 having the highest total score, without being limited thereto.

Depending on user's selection, the image display apparatus 100 according to an embodiment may determine a recommended view point, based on a user-preferred composition. For example, the user may desire to watch a 360-degree image in a user-preferred composition, regardless of a category of the 360-degree image. The user-preferred composition may be, but not limited to, one composition selected from among a plurality of compositions provided by the image display apparatus 100. For example, the image display apparatus 100 may provide a plurality of compositions such as a tripartite composition, a vertical line composition, a circular composition, a diagonal line, etc., as a composition in which the user may watch the 360-degree image. Once the user selects one of the plurality of compositions provided by the image display apparatus 100, the image display apparatus 100 may recognize the composition selected by the user as a user-preferred composition. When the user views the 360-degree image, the image display apparatus 100 may determine a recommended view point based on the user-preferred composition to be provided with the recommended view point corresponding to the user-preferred composition.

Referring to FIG. 6B, the image display apparatus 100 generates a saliency map 641, based on contour information of one or more objects detected in a search region 640. The saliency map 641 may be a map that distinguishably indicates a region having a distinctive brightness and/or color difference or a region having stronger characteristics of a contour when compared to other regions. For example, as shown in FIG. 6B, the image display apparatus 100 may detect a person who jumps a rope from the search region 640, and may brightly indicate a region corresponding to the detected person in the saliency map 641 based on contour information of the detected person.

When the view point of the 360-degree image is moved upon receipt of the user input of moving the view point of the 360-degree image from the control device 101, the image display apparatus 100 determines a view point in which a region corresponding to the person is located in a tripartite position on the saliency map 641, as a recommended view point of the 360-degree image. The image display apparatus 100 displays a region 650 corresponding to the recommended view point in the 360-degree image. Thus, the image display apparatus 100 may automatically determine a recommended view point matched to the recommended composition for the category of the 360-degree image or the user-preferred composition based on the user's selection, and may move the view point of the 360-degree image to the recommended view point.

Figure 7B:
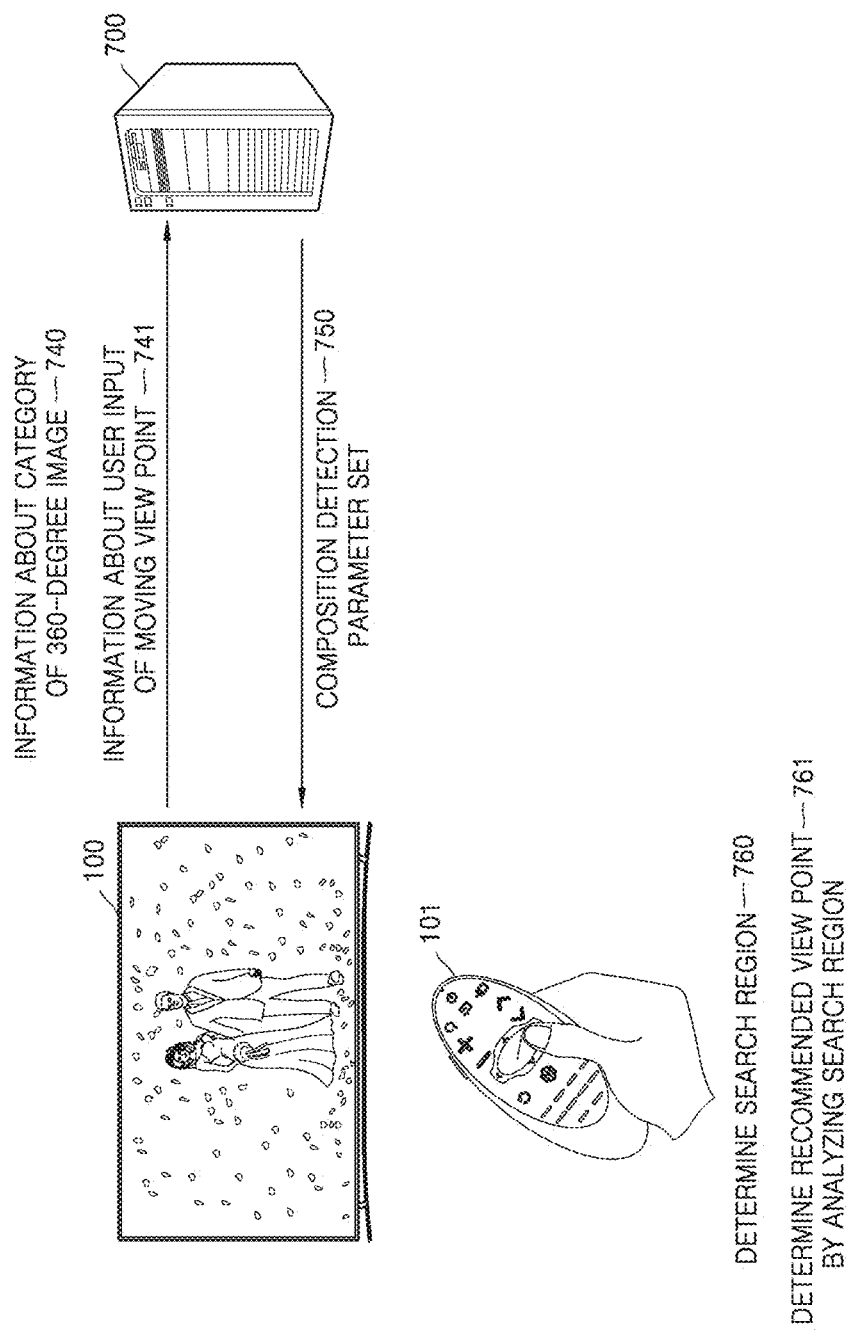

FIGS. 7A and 7B are views for describing a process of receiving information indicating a recommended view point from an external server according to an embodiment.

The image display apparatus 100 according to an embodiment may receive information indicating a recommended view point from an external device upon receipt of a user input to move a view point of a 360-degree image from the control device 101.

Referring to FIG. 7A, the image display apparatus 100 transmits information indicating a current display position of the 360-degree image 710 and information about a user input to move a view point 711 to an external server 700 in response to the user input of moving the view point of the 360-degree image received through the control device 101.

For example, when the 360-degree image is a moving image having a total play time of 1 hour, the information indicating the current display position of the 360-degree image 710 may be information indicating that an image corresponding to 31 minutes and 40 seconds is currently played in the moving image. The information about the user input to move a view point 711 may include, but not limited to, information about a currently displayed point in time, a direction in which the user desires to move the view point (e.g., up/down/left/right), a type of the user input (e.g., a long-touch input, a short-touch input, a single tap, double taps, etc.), etc.

The external server 700 may set a part of the 360-degree image as a search region as indicated by 720 based on the information indicating the current display position of the 360-degree image 710 and the information about the user input to move a view point 711. The 360-degree image currently played on the image display apparatus 100 and the category information of the 360-degree image may be stored in a database of the external server 700. Thus, the external server 700 may set the search region for determining the recommended view point in the 360-degree image, upon receipt of the information indicating the current display position of the 360-degree image 710 and the information about the user input of moving the view point 711 from the image display apparatus 100.

The search region is a partial region of the 360-degree region analyzed to determine a recommended view point, and may be set based on a direction in which the view point of the 360-degree image is moved in response to a user input. The external server 700 may recognize the number frame of a current display position in the entire 360-degree image based on the information indicating the current display position of the 360-degree image 710, and recognize a direction in which the view point is moved from the information about the user input of moving the view point 711. The external server 700 may set a search region based on the view point currently displayed in the currently played frame and the direction in which the view point of the 360-degree image is moved in response to the user input.

The external server 700 may analyze the search region by applying a composition detection parameter set for the category of the 360-degree image or the user-preferred composition, and may determine a recommended view point as indicated by 721 based on a result of analyzing the search region. The external server 700 may transmit information indicating the determined recommended view point 730 to the image display apparatus 100. The information indicating the recommended view point 730 may be expressed in the form of coordinates indicating the recommended view point or in a form distinguishably indicating a region corresponding to the recommended view point in the search region, without being limited to these examples.

The image display apparatus 100 may move the view point of the 360-degree image to the recommended view point based on the obtained information indicating the recommended view point 730, which is received from the external server 700.

According to an embodiment, the image display apparatus 100 may perform an operation of determining the recommended view point. For example, when the recommended view point is determined based on the composition detection parameter set for the category of the 360-degree image, the image display apparatus 100 may receive a composition detection parameter set stored in the data base of the external server 700 from the external server 700 and may determine the recommended view point based on the received composition detection parameter set.

Referring to FIG. 7B, the image display apparatus 100 may transmit category information 740 of the 360-degree image and information about a user input 741 to move the view point of the 360-degree image to the external server 700, upon receipt of the user input of moving the view point of the 360-degree image from the control device 101. The image display apparatus 100 receives a composition detection parameter set 750 for the category of the 360-degree image from the external server 700.

The image display apparatus 100 may set a search region as indicated by 760 in response to the user input of moving the view point of the 360-degree image and may determine a recommended view point as indicated by 761 by analyzing the set search region based on the received composition detection parameter set. The image display apparatus 100 may move the view point of the 360-degree image to the determined recommended view point. Thus, without manually controlling the view point of the 360-degree image to find a proper composition for user's viewing, the image display apparatus 100 may automatically detect a proper composition in the search region and move the view point of the 360-degree image to a view point corresponding to the detected composition.

When the external server 700 performs the operation of determining the recommended view point, a time required to determine the recommended view point may be reduced, and the image display apparatus 100 may move the view point of the 360-degree image to the recommended view point faster in response to the user input of moving the view point of the 360-degree image.

FIGS. 8A and 8B illustrate an example in which an image display apparatus according to an embodiment moves a view point of a 360-degree image at a different speed, based on a distance between a current view point and a recommended view point.

The image display apparatus 100 according to an embodiment may move the view point of the 360-degree image faster as a distance between the currently displayed view point and the recommended view point determined based on the composition detection parameter set is longer.

Referring to FIG. 8A, the image display apparatus 100 receives an input of moving a view point of a 360-degree image 800 through the control device 101. For example, in response to a user input to move the view point of the 360-degree image 800 to the right, the image display apparatus 100 may move the view point of the 360-degree image to the right. In this case, when the user input of moving the view point of the 360-degree image 800 to the right continues, the image display apparatus 100 may continuously move the view point of the 360-degree image to the right. The image display apparatus 100 may continuously update the search region when the user input of moving the view point of the 360-degree image to the right continues. For example, as the view point of the 360-degree image 800 is moved to the right, the search region may also be moved to the right. Once the user input of moving the view point of the 360-degree image 800 to the right is terminated, the image display apparatus 100 determines a recommended view point 811 by analyzing a finally updated search region. As the view point of the 360-degree image is gradually moved from the currently displayed view point 810 to the recommended view point 811, a moving speed of the view point may change with a distance between the two view points 810 and 811.

For example, movement of the view point shown in FIG. 8A corresponds to a case where the distance between the currently displayed view point 810 and the recommended view point 811 is relatively short, and movement of the view point shown in FIG. 8B corresponds to a case where the distance between the currently displayed view point 810 and the recommended view point 811 is relatively long. In this case, the view point of the 360-degree image 800 may be moved faster in the case shown in FIG. 8B than in the case shown in FIG. 8A. Thus, the image display apparatus 100 may allow the user to watch an image corresponding to the recommended view point 821 faster even when the distance between the currently displayed view point 810 and the recommended view point 821 is relatively long.

Figure 9:
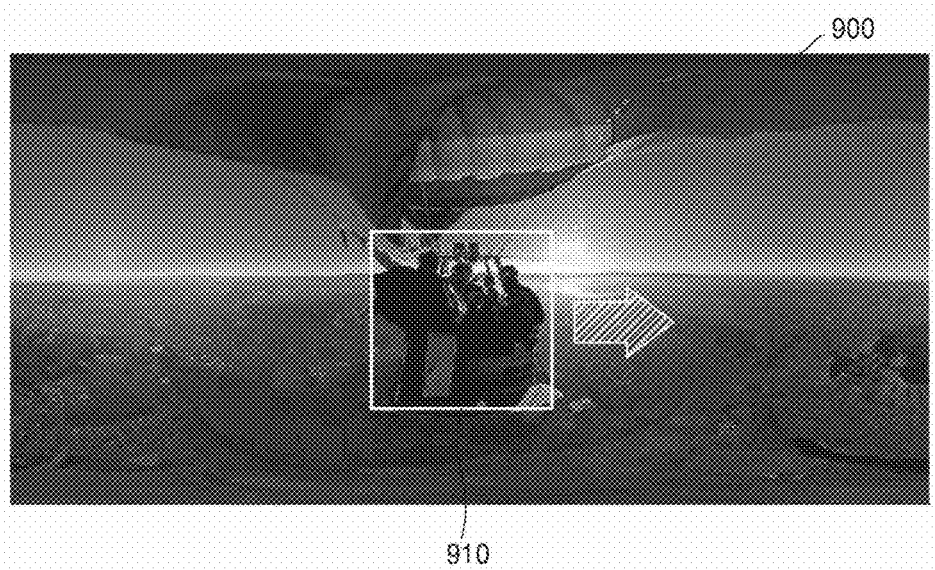
FIG. 9 illustrates an example in which an image display apparatus according to an embodiment moves a view point of a 360-degree image, based on movement of an object detected in the 360-degree image.

FIG. 9 illustrates an example in which an image display apparatus according to an embodiment moves a view point of a 360-degree image based on movement of an object detected in the 360-degree image.

According to an embodiment, the image display apparatus 100 may detect one or more objects in a currently displayed 360-degree image and may move a view point of the 360-degree image by further considering movement information of the detected one or more objects. The object detected in the 360-degree image may be an object related to a main event occurring in the 360-degree image. The image display apparatus 100 may detect one or more objects in the 360-degree image and move a view point of the 360-degree image along movement of the detected one or more objects, thereby providing an image having a proper composition for viewing and preventing the user from missing the main event occurring in the 360-degree image.

For example, once a recommended view point is determined upon receipt of the user input of moving the view point, the image display apparatus 100 may move the view point of the 360-degree image to a recommended view point.

If a region corresponding to the recommended view point is displayed on the display 220, the image display apparatus 100 may detect one or more objects from a region corresponding to the recommended view point. The detected one or more objects may be, but not limited to, a person and/or an animal appearing on the 360-degree image or an object related to a main event occurring in the 360-degree image. For example, if the 360-degree image is a movie or a drama, the detected one or more objects may be main characters appearing in the movie.

For example, referring to FIG. 9, a currently played 360-degree image may be an image captured during movement in a hot-air balloon. Once a recommended view point is determined upon receipt of a user input to move the view point of the 360-degree image, the image display apparatus 100 may move the view point of the 360-degree image to a recommended view point. When a region 900 corresponding to the recommended view point is displayed on the display 220 and persons 910 in the hot-air balloon appear on the region 900 corresponding to the recommended view point, the image display apparatus 100 may detect the persons 910 in the hot-air balloon as objects. As the persons 910 in the hot-air balloon in the region 900 corresponding to the recommended view point move, the image display apparatus 100 may move the view point of the 360-degree image based on movement information of the persons 910 in the hot-air balloon. For example, as shown in FIG. 9, as the people 910 in the hot-air balloon move to the right on the display 220, the image display apparatus 100 may move the view point of the 360-degree image to the right based on at least one of a moving direction and a moving speed of the persons 910 in the hot-air balloon. Thus, the image display apparatus 100 may prevent the user from missing a main event occurring in the 360-degree image while providing an image having a proper composition for watching.

According to an embodiment, as a flow of a story is changed or a scene is changed in the 360-degree image during movement of the view point of the 360-degree image along movement of the detected objects 910, the detected objects 910 may no longer appear on the display 220. In this case, the image display apparatus 100 may move the view point of the 360-degree image to, but not limited to, a preset initial view point (e.g., 0 degree).

Figure 10:
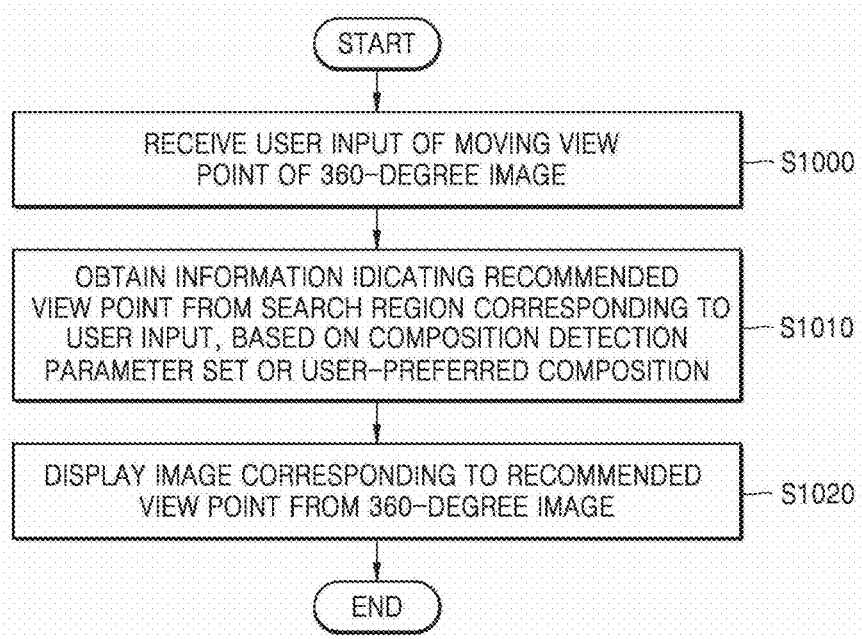
FIG. 10 is a flowchart of an image display method according to an embodiment.

FIG. 10 is a flowchart of an image display method according to an embodiment.

In operation S1000, the image display apparatus 100 receives a user input to move the view point of a 360-degree image.

The user input of moving the view point of the 360-degree image may be, but not limited to, an input of selecting a direction key in the control device 101. For example, when the control device 101 is implemented with a touch screen, the user input of moving the view point of the 360-degree image may mean, but not limited to, an input of touching an icon indicating a key corresponding to a particular direction. The view point of the 360-degree image may be moved discontinuously in a preset unit (e.g., in the unit of 30 degrees) or continuously, depending on a type of the user input of moving the view point of the 360-degree image (e.g., a short-touch input, a long-touch input, a single tap, double taps, etc.).

In operation S1010, the image display apparatus 100 obtains information indicating a recommended view point from a search region set in response to a user input based on at least one of a composition detection parameter set corresponding to a category of the 360-degree image and a user-preferred composition.

The search region is a partial region of the 360-degree region analyzed to determine a recommended view point, and may be set based on a direction in which the view point of the 360-degree image is moved in response to a user input. For example, once the user input of moving the view point of the 360-degree image in a particular direction starts being received, the image display apparatus 100 may set a region including a currently displayed region in the 360-degree image as an initial search region. A size of the search region may be determined based on at least one of a viewing angle at which the 360-degree image is displayed and an aspect ratio of a screen on which the 360-degree image is displayed. The size of the search region may be greater than a size of the screen on which the 360-degree image is displayed, and may increase proportionally to the viewing angle at which the 360-degree image is displayed on one screen. The size of the search region may be predetermined and stored in the image display apparatus 100, and the search range may be set to correspond to the predetermined stored size of the search region.

The image display apparatus 100 may update the search region until the user input of moving the view point of the 360-degree image is terminated. For example, if a user input to move the view point of the 360-degree image to the right is received continuously, the image display apparatus 100 may update the search region while continuously moving the search region to the right. Once the user input of moving the view point of the 360-degree image is terminated, the image display apparatus 100 obtains information indicating a recommended view point based on a result of analyzing a finally updated search region.

The composition detection parameter set may be determined by learning a recommended composition for a category in response to the input of the category information of the 360-degree image and a plurality of images belonging to the category into one or more neural networks.

According to an embodiment, the image display apparatus 100 may transmit category information indicating the category of a 360-degree image that the user currently views and information about a user input to move a view point of the 360-degree image to an external server, and may receive a composition detection parameter set for the category from the external server. In this case, an operation of determining the recommended view point, based on the composition detection parameter set or the user-preferred composition, may be performed by the image display apparatus 100. The image display apparatus 100 sets a search region, based on the view point of the 360-degree image that the user currently views and the user input of moving the view point of the 360-degree image. The processor 100 determines a view point corresponding to a region having a proper composition in the search region by analyzing the search region based on the composition detection parameter set or the user-preferred composition that is received from the external server.

According to an embodiment, an operation of determining the recommended view point may be performed by the external server. For example, the external server may store the 360-degree image that the user currently views through the image display apparatus 100 and the composition detection parameter set corresponding to the category of the 360-degree image. The image display apparatus 100 transmits information indicating a current display position of the 360-degree image and information about the user input of moving the view point of the 360-degree image to the external server. The image display apparatus 100 receives information about the recommended view point determined, based on the composition detection parameter set for the category of the 360-degree image or the user-preferred composition from the external server.

In operation S1020, the image display apparatus 100 moves the view point of the 360-degree image to the recommended view point based on the obtained information about the recommended view point.

The disclosed embodiments may be implemented in the form of program instructions that can be executed through various computer components and recorded in a computer-readable recording medium. The computer-readable recording medium may include a program command, a data file, a data structure and the like solely or in a combined manner. The program command recorded in the computer-readable recording medium may be a program command specially designed and configured for the embodiments or a program command known to be used by those skilled in the art of the computer software field. Examples of the computer-readable recording medium may include magnetic media such as hard disk, floppy disk, and magnetic tape, optical media such as compact disk read only memory (CD-ROM) and digital versatile disk (DVD), magneto-optical media such as floptical disk, and a hardware device especially configured to store and execute a program command, such as read only memory (ROM), random access memory (RAM) and flash memory, etc. Further, examples of the program instructions include a machine language code created by a complier and a high-level language code executable by a computer using an interpreter.

Those of ordinary skill in the art will appreciate that the disclosure may be implemented in different detailed ways without departing from the technical spirit of the disclosure. Accordingly, the aforementioned embodiments should be construed as being only illustrative, but should not be constructed as being restrictive from all aspects. For example, each element described as a single type may be implemented in a distributed manner, and likewise, elements described as being distributed may be implemented as a coupled type.

The scope of the disclosure is defined by the following claims rather than the detailed description, and the meanings and scope of the claims and all changes or modified forms derived from their equivalents should be construed as falling within the scope of the disclosure.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. An image display apparatus for displaying a 360-degree image, the image display apparatus comprising:
a display; and
a processor configured to:
control the display to display a first region corresponding to a first view point of the 360-degree image,
receive a user input for moving a view point of the 360-degree image from the first view point to a second view point,
identify a search region which is defined by the second view point according to the user input,
divide the search region into a plurality of regions, by analyzing the plurality of divided regions based on a composition detection parameter set corresponding to a category of the 360-degree image, obtain information indicating a recommended view point from among the plurality of divided regions, the recommended view point corresponding to a divided region which matches the composition detection parameter set corresponding to the category of the 360-degree image, and in response to obtaining the information indicating the recommended view point, automatically move a region to be displayed on the display from the first region to a region of the 360-degree image corresponding to the identified recommended view point.

2. The image display apparatus of claim 1, wherein the composition detection parameter set is determined by learning the recommended view point corresponding to the category of the 360-degree image in response to inputting category information indicating the category of the 360-degree image and a plurality of images belonging to the category into one or more neural networks.

3. The image display apparatus of claim 2, wherein the composition detection parameter set is determined in a form of a linear combination of one or more layers indicating one or more recommended compositions corresponding to the category of the 360-degree image and weight values applied to the one or more layers.

4. The image display apparatus of claim 1, wherein each of the divided regions has a size of a screen on which the 360-degree image is displayed.

5. The image display apparatus of claim 1, wherein the processor is further configured to:

transmit information indicating a current display position of the 360-degree image and information corresponding to the user input to move the view point of the 360-degree image to an external server; and obtain information about the recommended view point determined by the external server from the external server.

6. The image display apparatus of claim 1, wherein the search region is a partial region of a 360-degree region analyzed to determine the recommended view point, and is set based on a direction in which the view point of the 360-degree image is moved in response to the user input, and wherein a size of the search region is determined based on at least one of a viewing angle at which the 360-degree image is displayed and an aspect ratio of a screen on which the 360-degree image is displayed.

7. The image display apparatus of claim 1, wherein the processor is further configured to:

based on receiving the user input for moving the view point, identify an initial search region of the 360-degree image based on the first region, based on continuously receiving the user input for moving the view point, update the initial search region according to the continuously received user input moving the view point, and identify the recommended view point from the updated search region.

8. The image display apparatus of claim 1, wherein the category of the 360-degree image is determined based on at least one of a genre of the 360-degree image, a place where the 360-degree image is captured, and a content of the 360-degree image, and the processor is further configured to obtain information about the category of the 360-degree image based on at least one of a title of the 360-degree image and metadata of the 360-degree image.

9. The image display apparatus of claim 1, wherein the processor is further configured to set a speed at which the 360-degree image is moved from a current view point to the recommended view point based on at least one of a distance between the current view point of the 360-degree image and the recommended view point and a type of the user input to move the view point of the 360-degree image.

10. The image display apparatus of claim 1, wherein the processor is further configured to:

detect one or more objects included in the search region; and obtain the information corresponding to the 360-degree image based on movement of the detected one or more objects.

11. An image display method of displaying a 360-degree image, the image display method comprising:

displaying a first region corresponding to a first view point of the 360-degree image;

receiving a user input for moving a view point of the 360-degree image from the first view point to a second view point;

identifying a search region which is defined by the second view point according to the user input, divide the search region into a plurality of regions, by analyzing the plurality of divided regions based on a composition detection parameter set corresponding to a category of the 360-degree image, obtain information indicating a recommended view point from among the plurality of divided regions, the recommended view point corresponding to a divided region which matches the composition detection parameter set corresponding to the category of the 360-degree image; and in response to obtaining the information indicating the recommended view point, automatically moving a region to be displayed on the display from the first region to a region of the 360-degree image corresponding to the identified recommended view point.

12. The image display method of claim 11, wherein the composition detection parameter set is determined by learning the recommended view point corresponding to the category of the 360-degree image in response to inputting category information indicating the category of the 360-degree image and a plurality of images belonging to the category into one or more neural networks.

13. The image display method of claim 12, wherein the composition detection parameter set is determined in a form of a linear combination of one or more layers indicating one or more recommended compositions corresponding to the category of the 360-degree image and weight values applied to the one or more layers.

14. The image display method of claim 11, wherein each of regions each of the divided regions has a size of a screen corresponding to a size of a screen of the 360-degree image.

15. The image display method of claim 11, wherein the obtaining of the information about the recommended view point comprises:

transmitting information indicating a current display position of the 360-degree image and information corresponding to the user input to move the view point of the 360-degree image to an external server; and obtaining information about the recommended view point determined by the external server from the external server.

16. The image display method of claim 11, wherein the search region is a partial region of the 360-degree region analyzed to determine the recommended view point, and is set based on a direction in which the view point of the 360-degree image is moved in response to the user input, and a size of the search region is determined based on at least one of a viewing angle at which the 360-degree image is displayed and an aspect ratio of a screen on which the 360-degree image is displayed.

17. The image display method of claim 11, further comprising:

based on receiving the user input for moving the view point, identifying an initial search region of the 360-degree image based on the first region, based on continuously receiving the user input for moving the view point, updating the initial search region according to the continuously received user input moving the view point, and identifying the recommended view point from the updated search region.

18. The image display method of claim 11, wherein the category of the 360-degree image is determined based on at least one of a genre of the 360-degree image, a place where the 360-degree image is captured, and a content of the 360-degree image, and the image display method further comprises obtaining information corresponding to the category of the 360-degree image based on at least one of a title of the 360-degree image and metadata of the 360-degree image.

19. The image display method of claim 11, wherein the obtaining of the information about the recommended view point comprises:

detecting one or more objects included in the search region; and obtaining the information corresponding to the 360-degree image based on movement of the detected one or more objects.

20. A non-transitory computer-readable recording medium having recorded thereon a program that is executable by a computer to perform the image display method of claim 11.

* * * * *